United States Patent
Boyle

(10) Patent No.: US 9,213,493 B1
(45) Date of Patent: Dec. 15, 2015

(54) SORTED SERPENTINE MAPPING FOR STORAGE DRIVES

(75) Inventor: William B. Boyle, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 237 days.

(21) Appl. No.: 13/329,053

(22) Filed: Dec. 16, 2011

(51) Int. Cl.
*G06F 12/00* (2006.01)
*G06F 13/00* (2006.01)
*G06F 3/06* (2006.01)

(52) U.S. Cl.
CPC .............. *G06F 3/0638* (2013.01); *G06F 3/061* (2013.01); *G06F 3/064* (2013.01); *G06F 3/0676* (2013.01)

(58) Field of Classification Search
CPC ....................................................... G06F 3/0638
USPC ................................................................. 711/4
See application file for complete search history.

(56) References Cited

U.S. PATENT DOCUMENTS

| | | | |
|---|---|---|---|
| 4,769,770 A | 9/1988 | Miyadera et al. | |
| 4,992,936 A | 2/1991 | Katada et al. | |
| 5,121,480 A * | 6/1992 | Bonke et al. | 711/2 |
| 5,270,885 A * | 12/1993 | Satoh et al. | 360/77.04 |
| 5,293,282 A * | 3/1994 | Squires et al. | 360/77.08 |
| 5,613,066 A | 3/1997 | Matsushima et al. | |
| 5,819,298 A * | 10/1998 | Wong et al. | 1/1 |
| 5,983,309 A * | 11/1999 | Atsatt et al. | 711/4 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,092,231 A | 7/2000 | Sze | |
| 6,094,707 A | 7/2000 | Sokolov et al. | |
| 6,105,104 A * | 8/2000 | Guttmann et al. | 711/4 |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,182,250 B1 * | 1/2001 | Ng et al. | 714/704 |
| 6,182,550 B1 | 2/2001 | Brewington et al. | |
| 6,191,909 B1 | 2/2001 | Cloke et al. | |
| 6,195,218 B1 | 2/2001 | Guttmann et al. | |

(Continued)

FOREIGN PATENT DOCUMENTS

| | | | | |
|---|---|---|---|---|
| WO | WO00/01146 | * | 1/2000 | H04N 5/76 |
| WO | 2009/102425 | | 8/2009 | |

OTHER PUBLICATIONS

RE:Hard drive Inner or Outer tracks???, Matthias99, Apr. 12, 2004, retrieved from http://forums.anandtech.com/showthread.php?p=11055300 on Oct. 29, 2013.*

(Continued)

*Primary Examiner* — Sanjiv Shah
*Assistant Examiner* — Daniel C Chappell

(57) ABSTRACT

A disk drive is disclosed that utilizes sorted serpentine mapping of data tracks. In one embodiment, a plurality of physical heads of the disk drive is mapped to a plurality of logical heads. The plurality of logical heads is sorted according to the respective data rates of the physical heads, such as in the order of decreasing data rates. Data tracks are mapped using sorted serpentine mapping that utilizes the sorted order of the logical heads. Improved performance can thereby be attained.

23 Claims, 7 Drawing Sheets

(56) References Cited

U.S. PATENT DOCUMENTS

| | | |
|---|---|---|
| 6,202,121 B1 | 3/2001 | Walsh et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,240,501 B1 | 5/2001 | Hagersten |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,311,240 B1 * | 10/2001 | Boone et al. .................... 710/74 |
| 6,317,850 B1 | 11/2001 | Rothberg |
| 6,324,604 B1 | 11/2001 | Don et al. |
| 6,327,106 B1 | 12/2001 | Rothberg |
| 6,337,778 B1 | 1/2002 | Gagne |
| 6,339,811 B1 | 1/2002 | Gaertner et al. |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,454 B1 * | 6/2002 | Monroe, III .................... 360/63 |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,556,365 B2 | 4/2003 | Satoh |
| 6,574,774 B1 | 6/2003 | Vasiliev |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,636,049 B1 | 10/2003 | Lim et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,538 B1 * | 2/2004 | Saito et al. ................. 360/78.08 |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,728,054 B2 | 4/2004 | Chng et al. |
| 6,735,032 B2 | 5/2004 | Dunn et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,274 B1 | 8/2004 | Estakhri |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,829,688 B2 | 12/2004 | Grubbs et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,886,068 B2 | 4/2005 | Tomita |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,468 B2 | 5/2005 | Rege et al. |
| 6,895,500 B1 | 5/2005 | Rothberg |
| 6,898,730 B1 | 5/2005 | Hanan |
| 6,901,479 B2 | 5/2005 | Tomita |
| 6,910,099 B1 | 6/2005 | Wang et al. |
| 6,920,455 B1 | 7/2005 | Weschler |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,956,710 B2 | 10/2005 | Yun et al. |
| 6,961,814 B1 | 11/2005 | Thelin et al. |
| 6,965,489 B1 | 11/2005 | Lee et al. |
| 6,965,563 B1 | 11/2005 | Hospodor et al. |

(56) References Cited

U.S. PATENT DOCUMENTS

| | | | |
|---|---|---|---|
| 6,965,966 B1 | 11/2005 | Rothberg et al. | |
| 6,967,799 B1 | 11/2005 | Lee | |
| 6,967,810 B2 | 11/2005 | Kasiraj et al. | |
| 6,968,422 B1 | 11/2005 | Codilian et al. | |
| 6,968,450 B1 | 11/2005 | Rothberg et al. | |
| 6,973,495 B1 | 12/2005 | Milne et al. | |
| 6,973,570 B1 | 12/2005 | Hamlin | |
| 6,976,190 B1 | 12/2005 | Goldstone | |
| 6,980,386 B2 * | 12/2005 | Wach et al. | 360/63 |
| 6,983,316 B1 | 1/2006 | Milne et al. | |
| 6,986,007 B1 | 1/2006 | Procyk et al. | |
| 6,986,154 B1 | 1/2006 | Price et al. | |
| 6,992,852 B1 * | 1/2006 | Ying et al. | 360/75 |
| 6,995,933 B1 | 2/2006 | Codilian et al. | |
| 6,996,501 B1 | 2/2006 | Rothberg | |
| 6,996,669 B1 | 2/2006 | Dang et al. | |
| 7,002,926 B1 | 2/2006 | Eneboe et al. | |
| 7,003,674 B1 | 2/2006 | Hamlin | |
| 7,006,316 B1 | 2/2006 | Sargenti, Jr. et al. | |
| 7,009,820 B1 | 3/2006 | Hogg | |
| 7,012,771 B1 | 3/2006 | Asgari et al. | |
| 7,023,639 B1 | 4/2006 | Kupferman | |
| 7,024,491 B1 | 4/2006 | Hanmann et al. | |
| 7,024,549 B1 | 4/2006 | Luu et al. | |
| 7,024,614 B1 | 4/2006 | Thelin et al. | |
| 7,027,716 B1 | 4/2006 | Boyle et al. | |
| 7,028,174 B1 | 4/2006 | Atai-Azimi et al. | |
| 7,031,902 B1 | 4/2006 | Catiller | |
| 7,035,961 B2 | 4/2006 | Edgar et al. | |
| 7,046,465 B1 | 5/2006 | Kupferman | |
| 7,046,471 B2 | 5/2006 | Meyer et al. | |
| 7,046,488 B1 | 5/2006 | Hogg | |
| 7,050,252 B1 | 5/2006 | Vallis | |
| 7,054,937 B1 | 5/2006 | Milne et al. | |
| 7,055,000 B1 | 5/2006 | Severtson | |
| 7,055,167 B1 | 5/2006 | Masters | |
| 7,057,836 B1 | 6/2006 | Kupferman | |
| 7,062,398 B1 | 6/2006 | Rothberg | |
| 7,075,746 B1 | 7/2006 | Kupferman | |
| 7,076,391 B1 * | 7/2006 | Pakzad et al. | 702/118 |
| 7,076,604 B1 | 7/2006 | Thelin | |
| 7,082,007 B2 | 7/2006 | Liu et al. | |
| 7,082,494 B1 | 7/2006 | Thelin et al. | |
| 7,088,538 B1 | 8/2006 | Codilian et al. | |
| 7,088,545 B1 | 8/2006 | Singh et al. | |
| 7,089,355 B2 | 8/2006 | Auerbach et al. | |
| 7,092,186 B1 | 8/2006 | Hogg | |
| 7,095,577 B1 | 8/2006 | Codilian et al. | |
| 7,099,095 B1 | 8/2006 | Subrahmanyam et al. | |
| 7,106,537 B1 | 9/2006 | Bennett | |
| 7,106,947 B2 | 9/2006 | Boyle et al. | |
| 7,110,202 B1 | 9/2006 | Vasquez | |
| 7,111,116 B1 | 9/2006 | Boyle et al. | |
| 7,113,358 B2 | 9/2006 | Zayas et al. | |
| 7,114,029 B1 | 9/2006 | Thelin | |
| 7,120,726 B2 * | 10/2006 | Chen et al. | 711/4 |
| 7,120,737 B1 | 10/2006 | Thelin | |
| 7,120,806 B1 | 10/2006 | Codilian et al. | |
| 7,126,776 B1 | 10/2006 | Warren, Jr. et al. | |
| 7,129,763 B1 | 10/2006 | Bennett et al. | |
| 7,133,600 B1 | 11/2006 | Boyle | |
| 7,136,244 B1 * | 11/2006 | Rothberg | 360/53 |
| 7,146,094 B1 | 12/2006 | Boyle | |
| 7,149,046 B1 | 12/2006 | Coker et al. | |
| 7,150,036 B1 | 12/2006 | Milne et al. | |
| 7,155,448 B2 | 12/2006 | Winter | |
| 7,155,616 B1 | 12/2006 | Hamlin | |
| 7,171,108 B1 | 1/2007 | Masters et al. | |
| 7,171,110 B1 | 1/2007 | Wilshire | |
| 7,194,576 B1 | 3/2007 | Boyle | |
| 7,199,981 B2 | 4/2007 | Zabtcioglu | |
| 7,200,698 B1 | 4/2007 | Rothberg | |
| 7,205,805 B1 | 4/2007 | Bennett | |
| 7,206,497 B1 | 4/2007 | Boyle et al. | |
| 7,215,496 B1 | 5/2007 | Kupferman et al. | |
| 7,215,771 B1 | 5/2007 | Hamlin | |
| 7,237,054 B1 | 6/2007 | Cain et al. | |
| 7,240,161 B1 | 7/2007 | Boyle | |
| 7,249,365 B1 | 7/2007 | Price et al. | |
| 7,254,671 B2 * | 8/2007 | Haswell | 711/112 |
| 7,263,709 B1 | 8/2007 | Krapf | |
| 7,274,639 B1 | 9/2007 | Codilian et al. | |
| 7,274,659 B2 | 9/2007 | Hospodor | |
| 7,275,116 B1 | 9/2007 | Hanmann et al. | |
| 7,280,302 B1 | 10/2007 | Masiewicz | |
| 7,283,316 B2 | 10/2007 | Chiao et al. | |
| 7,292,774 B1 | 11/2007 | Masters et al. | |
| 7,292,775 B1 | 11/2007 | Boyle et al. | |
| 7,296,284 B1 | 11/2007 | Price et al. | |
| 7,298,568 B2 | 11/2007 | Ehrlich et al. | |
| 7,302,501 B1 | 11/2007 | Cain et al. | |
| 7,302,579 B1 | 11/2007 | Cain et al. | |
| 7,318,088 B1 | 1/2008 | Mann | |
| 7,319,806 B1 | 1/2008 | Willner et al. | |
| 7,325,244 B2 | 1/2008 | Boyle et al. | |
| 7,330,323 B1 | 2/2008 | Singh et al. | |
| 7,343,517 B2 | 3/2008 | Miller et al. | |
| 7,346,790 B1 | 3/2008 | Klein | |
| 7,366,641 B1 | 4/2008 | Masiewicz et al. | |
| 7,369,340 B1 | 5/2008 | Dang et al. | |
| 7,369,343 B1 | 5/2008 | Yeo et al. | |
| 7,372,650 B1 | 5/2008 | Kupferman | |
| 7,380,147 B1 | 5/2008 | Sun | |
| 7,392,340 B1 | 6/2008 | Dang et al. | |
| 7,404,013 B1 | 7/2008 | Masiewicz | |
| 7,406,545 B1 | 7/2008 | Rothberg et al. | |
| 7,408,731 B2 | 8/2008 | Uemura et al. | |
| 7,412,585 B2 | 8/2008 | Uemura | |
| 7,415,571 B1 | 8/2008 | Hanan | |
| 7,436,610 B1 | 10/2008 | Thelin | |
| 7,436,614 B2 * | 10/2008 | Uchida | 360/64 |
| 7,437,502 B1 | 10/2008 | Coker | |
| 7,440,214 B1 | 10/2008 | Ell et al. | |
| 7,440,224 B2 | 10/2008 | Ehrlich et al. | |
| 7,451,344 B1 | 11/2008 | Rothberg | |
| 7,471,483 B1 | 12/2008 | Ferris et al. | |
| 7,471,486 B1 | 12/2008 | Coker et al. | |
| 7,486,060 B1 | 2/2009 | Bennett | |
| 7,486,460 B2 | 2/2009 | Tsuchinaga et al. | |
| 7,490,212 B2 | 2/2009 | Kasiraj et al. | |
| 7,496,493 B1 | 2/2009 | Stevens | |
| 7,509,471 B2 | 3/2009 | Gorobets | |
| 7,516,267 B2 | 4/2009 | Coulson et al. | |
| 7,518,819 B1 | 4/2009 | Yu et al. | |
| 7,526,184 B1 | 4/2009 | Parkinen et al. | |
| 7,529,880 B2 | 5/2009 | Chung et al. | |
| 7,539,924 B1 | 5/2009 | Vasquez et al. | |
| 7,543,117 B1 | 6/2009 | Hanan | |
| 7,551,383 B1 | 6/2009 | Kupferman | |
| 7,562,282 B1 | 7/2009 | Rothberg | |
| 7,577,973 B1 | 8/2009 | Kapner, III et al. | |
| 7,596,797 B1 | 9/2009 | Kapner, III et al. | |
| 7,599,139 B1 | 10/2009 | Bombet et al. | |
| 7,603,530 B1 | 10/2009 | Liikanen et al. | |
| 7,619,841 B1 | 11/2009 | Kupferman | |
| 7,633,701 B2 * | 12/2009 | Gill et al. | 360/72.1 |
| 7,647,544 B1 | 1/2010 | Masiewicz | |
| 7,649,704 B1 | 1/2010 | Bombet et al. | |
| 7,653,927 B1 | 1/2010 | Kapner, III et al. | |
| 7,656,603 B1 | 2/2010 | Xing | |
| 7,656,763 B1 | 2/2010 | Jin et al. | |
| 7,657,149 B2 | 2/2010 | Boyle | |
| 7,669,044 B2 | 2/2010 | Fitzgerald et al. | |
| 7,672,072 B1 | 3/2010 | Boyle et al. | |
| 7,673,075 B1 | 3/2010 | Masiewicz | |
| 7,685,360 B1 | 3/2010 | Brunnett et al. | |
| 7,688,540 B1 | 3/2010 | Mei et al. | |
| 7,724,461 B1 | 5/2010 | McFadyen et al. | |
| 7,725,584 B1 | 5/2010 | Hanmann et al. | |
| 7,730,295 B1 | 6/2010 | Lee | |
| 7,760,458 B1 | 7/2010 | Trinh | |
| 7,768,776 B1 | 8/2010 | Szeremeta et al. | |
| 7,804,657 B1 | 9/2010 | Hogg et al. | |
| 7,813,954 B1 | 10/2010 | Price et al. | |

(56) References Cited

U.S. PATENT DOCUMENTS

| | | | |
|---|---|---|---|
| 7,827,320 B1 | 11/2010 | Stevens | |
| 7,839,588 B1 | 11/2010 | Dang et al. | |
| 7,840,878 B1 | 11/2010 | Tang et al. | |
| 7,843,660 B1 | 11/2010 | Yeo | |
| 7,852,596 B2 | 12/2010 | Boyle et al. | |
| 7,859,782 B1 | 12/2010 | Lee | |
| 7,860,836 B1 | 12/2010 | Natanzon et al. | |
| 7,872,822 B1* | 1/2011 | Rothberg | 360/31 |
| 7,885,921 B2 | 2/2011 | Mahar et al. | |
| 7,898,756 B1 | 3/2011 | Wang | |
| 7,898,762 B1 | 3/2011 | Guo et al. | |
| 7,900,037 B1* | 3/2011 | Fallone et al. | 713/2 |
| 7,907,364 B2 | 3/2011 | Boyle et al. | |
| 7,929,234 B1 | 4/2011 | Boyle et al. | |
| 7,933,087 B1 | 4/2011 | Tsai et al. | |
| 7,933,090 B1 | 4/2011 | Jung et al. | |
| 7,934,030 B1 | 4/2011 | Sargenti, Jr. et al. | |
| 7,940,491 B2 | 5/2011 | Szeremeta et al. | |
| 7,944,639 B1 | 5/2011 | Wang | |
| 7,945,727 B2 | 5/2011 | Rothberg et al. | |
| 7,974,029 B2 | 7/2011 | Tsai et al. | |
| 7,974,039 B1 | 7/2011 | Xu et al. | |
| 7,982,993 B1* | 7/2011 | Tsai et al. | 360/48 |
| 7,984,200 B1 | 7/2011 | Bombet et al. | |
| 7,990,648 B1 | 8/2011 | Wang | |
| 7,992,179 B1 | 8/2011 | Kapner, III et al. | |
| 8,004,785 B1 | 8/2011 | Tsai et al. | |
| 8,006,027 B1 | 8/2011 | Stevens et al. | |
| 8,014,094 B1 | 9/2011 | Jin | |
| 8,014,977 B1 | 9/2011 | Masiewicz et al. | |
| 8,019,914 B1 | 9/2011 | Vasquez et al. | |
| 8,031,423 B1* | 10/2011 | Tsai et al. | 360/48 |
| 8,040,625 B1 | 10/2011 | Boyle et al. | |
| 8,078,943 B1 | 12/2011 | Lee | |
| 8,079,045 B2 | 12/2011 | Krapf et al. | |
| 8,082,433 B1 | 12/2011 | Fallone et al. | |
| 8,085,487 B1 | 12/2011 | Jung et al. | |
| 8,089,719 B1 | 1/2012 | Dakroub | |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,116,020 B1* | 2/2012 | Lee | 360/31 |
| 8,116,025 B1 | 2/2012 | Chan et al. | |
| 8,134,793 B1 | 3/2012 | Vasquez et al. | |
| 8,134,798 B1* | 3/2012 | Thelin et al. | 360/78.04 |
| 8,139,301 B1 | 3/2012 | Li et al. | |
| 8,139,310 B1 | 3/2012 | Hogg | |
| 8,144,419 B1 | 3/2012 | Liu | |
| 8,145,452 B1 | 3/2012 | Masiewicz et al. | |
| 8,149,528 B1 | 4/2012 | Suratman et al. | |
| 8,154,812 B1 | 4/2012 | Boyle et al. | |
| 8,159,768 B1 | 4/2012 | Miyamura | |
| 8,161,328 B1 | 4/2012 | Wilshire | |
| 8,164,849 B1 | 4/2012 | Szeremeta et al. | |
| 8,174,780 B1 | 5/2012 | Tsai et al. | |
| 8,179,627 B2 | 5/2012 | Chang et al. | |
| 8,190,575 B1 | 5/2012 | Ong et al. | |
| 8,194,338 B1 | 6/2012 | Zhang | |
| 8,194,340 B1 | 6/2012 | Boyle et al. | |
| 8,194,341 B1 | 6/2012 | Boyle | |
| 8,201,066 B1 | 6/2012 | Wang | |
| 8,271,692 B1 | 9/2012 | Dinh et al. | |
| 8,279,550 B1 | 10/2012 | Hogg | |
| 8,281,218 B1 | 10/2012 | Ybarra et al. | |
| 8,285,923 B2 | 10/2012 | Stevens | |
| 8,289,656 B1 | 10/2012 | Huber | |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1* | 12/2012 | Bennett | 331/57 |
| 8,332,695 B2 | 12/2012 | Dalphy et al. | |
| 8,339,919 B1 | 12/2012 | Lee | |
| 8,341,337 B1 | 12/2012 | Ong et al. | |
| 8,341,339 B1* | 12/2012 | Boyle et al. | 711/103 |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,770 B1 | 4/2013 | O'Dell et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,441,909 B1 | 5/2013 | Thayamballi et al. | |
| 8,443,167 B1 | 5/2013 | Fallone et al. | |
| 8,456,980 B1 | 6/2013 | Thayamballi | |
| 8,458,526 B2 | 6/2013 | Dalphy et al. | |
| 8,462,466 B2 | 6/2013 | Huber | |
| 8,467,151 B1 | 6/2013 | Huber | |
| 8,483,027 B1 | 7/2013 | Mak et al. | |
| 8,489,841 B1 | 7/2013 | Strecke et al. | |
| 8,493,679 B1 | 7/2013 | Boguslawski et al. | |
| 8,499,198 B1 | 7/2013 | Messenger et al. | |
| 8,514,506 B1 | 8/2013 | Li et al. | |
| 8,554,741 B1 | 10/2013 | Malina | |
| 8,560,759 B1* | 10/2013 | Boyle et al. | 711/101 |
| 8,576,509 B1 | 11/2013 | Hogg | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,582,223 B1 | 11/2013 | Garani et al. | |
| 8,582,231 B1 | 11/2013 | Kermiche et al. | |
| 8,589,773 B1 | 11/2013 | Wang et al. | |
| 8,593,753 B1 | 11/2013 | Anderson | |
| 8,599,512 B2 | 12/2013 | Hogg | |
| 8,605,379 B1 | 12/2013 | Sun | |
| 8,611,031 B1 | 12/2013 | Tan et al. | |
| 8,611,032 B2 | 12/2013 | Champion et al. | |
| 8,612,798 B1 | 12/2013 | Tsai | |
| 8,619,383 B1 | 12/2013 | Jung et al. | |
| 8,619,508 B1 | 12/2013 | Krichevsky et al. | |
| 8,619,529 B1 | 12/2013 | Liew et al. | |
| 8,621,115 B1 | 12/2013 | Bombet et al. | |
| 8,621,133 B1 | 12/2013 | Boyle | |
| 8,625,224 B1 | 1/2014 | Lin et al. | |
| 8,625,225 B1 | 1/2014 | Wang | |
| 8,626,463 B2 | 1/2014 | Stevens et al. | |
| 8,630,052 B1* | 1/2014 | Jung et al. | 360/55 |
| 8,631,188 B1 | 1/2014 | Heath et al. | |
| 8,635,412 B1 | 1/2014 | Wilshire | |
| 8,661,193 B1 | 2/2014 | Cobos et al. | |
| 8,665,547 B1 | 3/2014 | Yeo et al. | |
| 8,667,248 B1 | 3/2014 | Neppalli | |
| 8,670,205 B1 | 3/2014 | Malina et al. | |
| 8,671,250 B2 | 3/2014 | Lee | |
| 8,681,442 B2 | 3/2014 | Hogg | |
| 8,681,445 B1 | 3/2014 | Kermiche et al. | |
| 8,683,295 B1 | 3/2014 | Syu et al. | |
| 8,687,307 B1 | 4/2014 | Patton, III | |
| 8,687,313 B2 | 4/2014 | Selvaraj | |
| 8,698,492 B1 | 4/2014 | Mak et al. | |
| 8,699,171 B1 | 4/2014 | Boyle | |
| 8,699,172 B1 | 4/2014 | Gunderson et al. | |
| 8,711,500 B1 | 4/2014 | Fong et al. | |
| 8,711,506 B1 | 4/2014 | Giovenzana et al. | |
| 8,711,665 B1 | 4/2014 | Abdul Hamid | |
| 8,717,694 B1 | 5/2014 | Liew et al. | |
| 8,717,695 B1 | 5/2014 | Lin et al. | |
| 8,730,612 B1 | 5/2014 | Haralson | |

(56) References Cited

U.S. PATENT DOCUMENTS

| | | | |
|---|---|---|---|
| 8,743,502 B1 | 6/2014 | Bonke et al. | |
| 8,749,911 B1 | 6/2014 | Sun et al. | |
| 8,753,146 B1 | 6/2014 | Szeremeta et al. | |
| 8,755,136 B1 | 6/2014 | Ng et al. | |
| 8,756,361 B1 | 6/2014 | Carlson et al. | |
| 8,760,782 B1 | 6/2014 | Garani et al. | |
| 8,760,792 B1 | 6/2014 | Tam | |
| 8,769,593 B1 | 7/2014 | Schwartz et al. | |
| 8,773,793 B1 | 7/2014 | McFadyen | |
| 8,773,802 B1 | 7/2014 | Anderson et al. | |
| 8,773,807 B1 | 7/2014 | Chia et al. | |
| 8,773,957 B1 | 7/2014 | Champion et al. | |
| 8,780,470 B1 | 7/2014 | Wang et al. | |
| 8,782,334 B1 | 7/2014 | Boyle et al. | |
| 8,786,976 B1 | 7/2014 | Kang et al. | |
| 8,787,125 B1 | 7/2014 | Lee | |
| 8,792,196 B1 | 7/2014 | Lee | |
| 8,792,200 B1 | 7/2014 | Tam et al. | |
| 8,797,667 B1 | 8/2014 | Barlow et al. | |
| 8,799,977 B1 | 8/2014 | Kapner, III et al. | |
| 8,817,413 B1* | 8/2014 | Knigge et al. | 360/75 |
| 8,817,584 B1 | 8/2014 | Selvaraj | |
| 8,825,976 B1 | 9/2014 | Jones | |
| 8,825,977 B1 | 9/2014 | Syu et al. | |
| 8,856,438 B1 | 10/2014 | Warner et al. | |
| 2001/0042166 A1* | 11/2001 | Wilson et al. | 711/112 |
| 2003/0065872 A1* | 4/2003 | Edgar et al. | 711/4 |
| 2003/0220943 A1 | 11/2003 | Curran et al. | |
| 2004/0019718 A1 | 1/2004 | Schauer et al. | |
| 2004/0109376 A1 | 6/2004 | Lin | |
| 2005/0069298 A1 | 3/2005 | Kasiraj et al. | |
| 2005/0071537 A1 | 3/2005 | New et al. | |
| 2005/0138265 A1* | 6/2005 | Nguyen et al. | 711/4 |
| 2005/0144517 A1* | 6/2005 | Zayas | 714/8 |
| 2005/0157416 A1 | 7/2005 | Ehrlich et al. | |
| 2006/0090030 A1 | 4/2006 | Ijdens et al. | |
| 2006/0112138 A1 | 5/2006 | Fenske et al. | |
| 2006/0117161 A1 | 6/2006 | Venturi | |
| 2006/0181993 A1 | 8/2006 | Blacquiere et al. | |
| 2007/0016721 A1 | 1/2007 | Gay | |
| 2007/0067603 A1 | 3/2007 | Yamamoto et al. | |
| 2007/0174582 A1 | 7/2007 | Feldman | |
| 2007/0204100 A1 | 8/2007 | Shin et al. | |
| 2007/0226394 A1 | 9/2007 | Noble | |
| 2007/0245064 A1 | 10/2007 | Liu | |
| 2007/0288686 A1 | 12/2007 | Arcedera et al. | |
| 2007/0294589 A1 | 12/2007 | Jarvis et al. | |
| 2008/0098195 A1 | 4/2008 | Cheon et al. | |
| 2008/0104308 A1 | 5/2008 | Mo et al. | |
| 2008/0183955 A1 | 7/2008 | Yang et al. | |
| 2008/0195801 A1 | 8/2008 | Cheon et al. | |
| 2008/0256287 A1 | 10/2008 | Lee et al. | |
| 2008/0256295 A1 | 10/2008 | Lambert et al. | |
| 2008/0270680 A1 | 10/2008 | Chang | |
| 2008/0307192 A1 | 12/2008 | Sinclair et al. | |
| 2009/0019218 A1 | 1/2009 | Sinclair et al. | |
| 2009/0043985 A1 | 2/2009 | Tuuk et al. | |
| 2009/0055620 A1 | 2/2009 | Feldman et al. | |
| 2009/0063548 A1 | 3/2009 | Rusher et al. | |
| 2009/0113702 A1 | 5/2009 | Hogg | |
| 2009/0119353 A1 | 5/2009 | Oh et al. | |
| 2009/0150599 A1 | 6/2009 | Bennett | |
| 2009/0154254 A1 | 6/2009 | Wong et al. | |
| 2009/0164535 A1 | 6/2009 | Gandhi et al. | |
| 2009/0164696 A1 | 6/2009 | Allen et al. | |
| 2009/0187732 A1 | 7/2009 | Greiner et al. | |
| 2009/0193184 A1 | 7/2009 | Yu et al. | |
| 2009/0198952 A1 | 8/2009 | Khmelnitsky et al. | |
| 2009/0204750 A1 | 8/2009 | Estakhri et al. | |
| 2009/0222643 A1 | 9/2009 | Chu | |
| 2009/0240873 A1 | 9/2009 | Yu et al. | |
| 2009/0271581 A1 | 10/2009 | Hinrichs, Jr. | |
| 2009/0276604 A1 | 11/2009 | Baird et al. | |
| 2010/0011275 A1 | 1/2010 | Yang | |
| 2010/0061150 A1 | 3/2010 | Wu et al. | |
| 2010/0161881 A1 | 6/2010 | Nagadomi et al. | |
| 2010/0169543 A1 | 7/2010 | Edgington et al. | |
| 2010/0169551 A1 | 7/2010 | Yano et al. | |
| 2010/0208385 A1 | 8/2010 | Toukairin | |
| 2010/0306551 A1 | 12/2010 | Meyer et al. | |
| 2011/0167049 A1 | 7/2011 | Ron | |
| 2011/0226729 A1 | 9/2011 | Hogg | |
| 2011/0304935 A1 | 12/2011 | Chang et al. | |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |

OTHER PUBLICATIONS

RE:Hard drive Inner or Outer tracks???, Matthias99, Apr. 12, 2004, retrieved from http://forums.anandtech.com/showthread.php?p=11055300 on Oct. 29, 2013 (1 pages).*
Definition of adjacent, Merriam-Webster Dictionary, retrieved from http://www.merriam-webster.com/dictionary/adjacent on Oct. 30, 2013 (1 page).*
RE:Hard drive Inner or Outer tracks???, Matthias99, Apr. 12, 2004, retrieved from http://forums.anandtech.com/showthread.php?p=11055300 on Oct. 29, 2013 (1 page).*
You Don't Know Jack about Disks, Dave Anderson, Seagate Technologies, Queue—Storage Queue, vol. 1, issue 4, Jun. 2003, pp. 20-30 (11 pages).*
HDD from inside: Tracks and Zones. How hard it can be?, Artem Rubtsov, Aug. 2009, retrieved from http://hddscan.com/doc/HDD_Tracks_and_Zones.html on Mar. 26, 2015 (15 pages).*
Rosenblum, Mendel and Ousterhout, John K. (Feb. 1992), "The Design and Implementation of a Log-Structured File System." ACM Transactions on Computer Systems, vol. 10, Issue 1, pp. 26-52.
Rosenblum, "The Design and Implementation of a Log-structured File System", EECS Department, University of California, Berkeley, Technical Report No. UCB/CSD-92-696, Jun. 1992.
"Amer, et al., ""Design Issues for a Shingled Write Disk System"", 26th IEEE Symposium on Massive Storage Systems and Technologies: Research Track (MSST2010), May 2010, 12 pages."

* cited by examiner

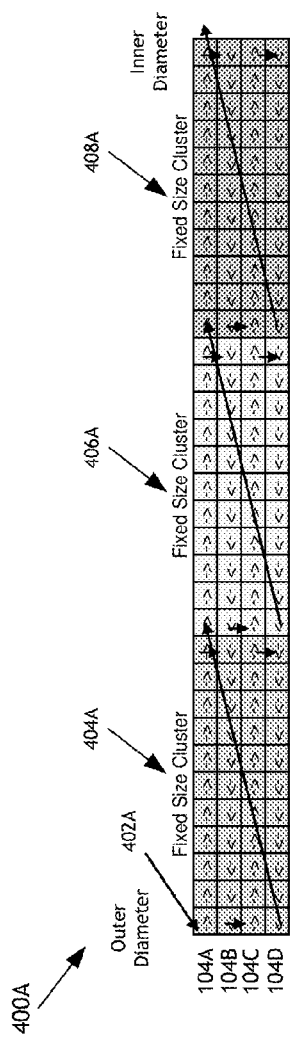
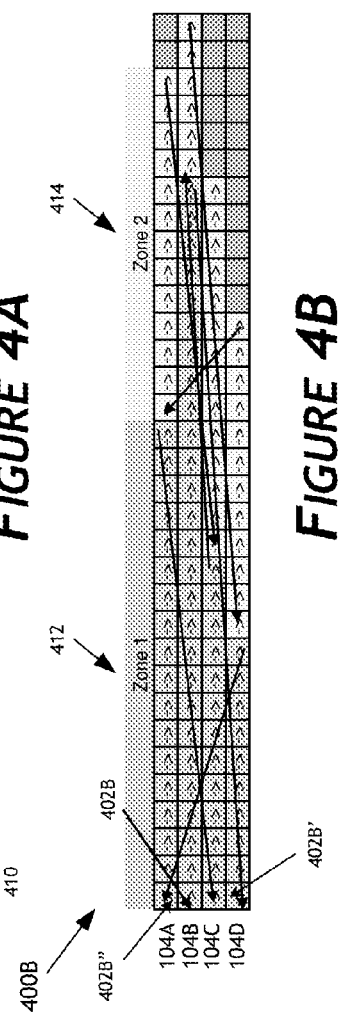
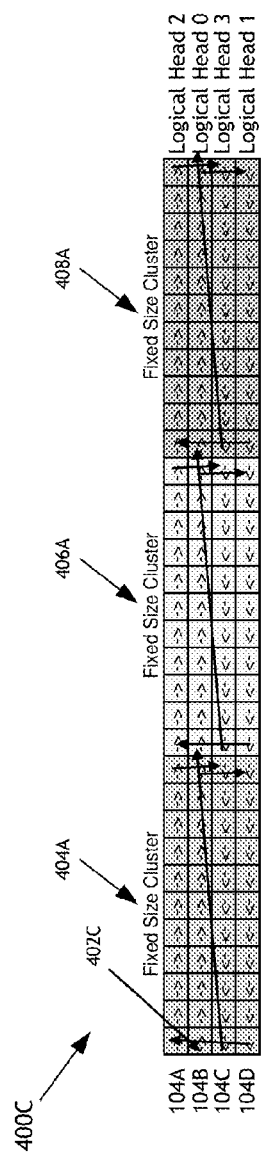
FIGURE 4A
FIGURE 4B
FIGURE 4C

SORTED SERPENTINE MAPPING FOR STORAGE DRIVES

BACKGROUND

1. Technical Field

This disclosure relates to disk drives and data storage systems for computer systems. More particularly, the disclosure relates to systems and methods for using sorted serpentine mapping for disk drives.

2. Description of the Related Art

Disk drives typically comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A multi-head disk drive comprises multiple heads and disk surfaces, where each head is configured to write data to and read data from a respective disk surface. Each disk surface may be formatted into a number of data zones, where each data zone is associated with a particular data transfer rate. When a sequence of data is written to or read from the disk drive, format variations among the disk surfaces in the disk drive may result in undesirable performance drawbacks, such as large fluctuations in data access rates.

BRIEF DESCRIPTION OF THE DRAWINGS

Systems and methods that embody the various features of the invention will now be described with reference to the following drawings, in which:

FIG. 4A illustrates serpentine mapping according to one embodiment of the invention.

FIG. 4B illustrates sorted data zones mapping according to one embodiment of the invention.

FIG. 4C illustrates sorted serpentine mapping according to one embodiment of the invention.

DETAILED DESCRIPTION OF SPECIFIC EMBODIMENTS

Figures 1A, 1B:
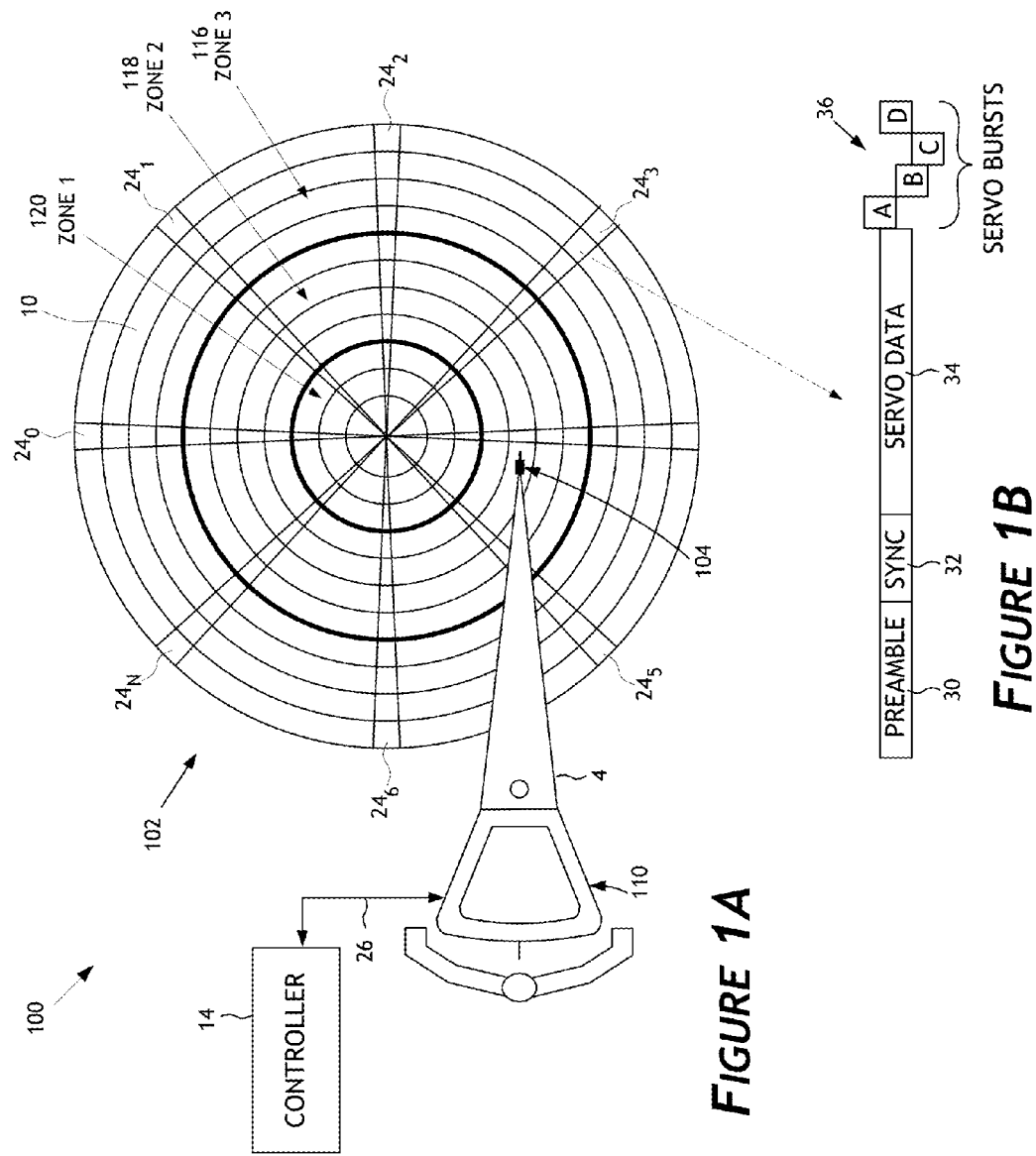
FIG. 1A illustrates a disk drive according to one embodiment of the invention.
FIG. 1B illustrates the format of a servo sector according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

A multi-head disk drive may comprise multiple heads and multiple platters, each of which may for example comprise two disk surfaces. Each head may be configured to access a respective disk surface (e.g., read data from and write data to the associated disk surface). Disk surfaces may further comprise a plurality of data tracks, which may be grouped into a plurality of cylinders. Especially in disk drives where adjacent tracks seeks are more efficient than switching from a particular head to a next head, it may be advantageous to map data tracks using serpentine mapping, which determines the sequence by which the physical locations of the disk drive are mapped to logical addresses. When serpentine mapping is used, a particular head can map all tracks in a particular cluster or zone by switching between mapping in forward (e.g., away from the outer diameter of a platter) and reverse directions. After making a pass over all tracks in the cluster, the disk drive can switch to a next head and repeat this process for all tracks associated with the next head. This mapping can be continued until all tracks have been mapped. However, one problem with serpentine mapping is that a first logical address of the disk drive (e.g., LBA 0) may not be mapped to a physical location in the disk drive having the highest data rate. In many applications, such as bootstrapping of an operating system during initialization, benchmarking, etc., it is important to have the first logical address mapped to a disk drive location having the highest data rate.

In addition, each disk surface of the disk drive may also be formatted into a number of data zones, where each data zone is associated with a particular data rate. The format may vary from disk surface to disk surface within a disk drive. This may be due to differences in performance (e.g., data rate) of respective heads and/or other factors. For example, tracks and/or cylinders located near the outer diameter of disk platters tend to have higher data rates than tracks and/or cylinder located near the inner diameter because while the angular velocity remains constant, the linear velocity decreases as heads move closer to the inner diameter (and the radius decreases). Accordingly, tracks and/or cylinders may be grouped into data zones based on their proximity to the outer diameter. A plurality of data zones may be sorted in accordance with data rates, and heads may be configured to map tracks starting from a zone having the highest data rate and continuing with a zone having the next highest data rate. However, one problem with using this approach is that seek times may be longer when compared to using serpentine mapping. Because for a particular zone the disk drive may remain on tracks associated with a high data rate head for a greater number of tracks in relation with lower data rate head(s), the distance traversed during switching to a lower data rate head (e.g., the distance between the last track associated with the high data rate head and first track associated with the lower data rate head) may not be constrained. Accordingly, seek times within a particular zone may be longer than those achieved using serpentine mapping.

In some embodiments of the present invention, a plurality of physical heads of a disk drive is associated with or mapped to a plurality of logical heads. The plurality of logical heads is sorted according to the respective data rates of the physical heads. For example, a physical head with the highest data rate is mapped to the first logical head, while the physical head with the lowest data rate is mapped to the last logical head. When serpentine mapping is utilized, the first logical address of the disk drive (e.g., LBA 0) is mapped to the physical location in the disk drive (e.g., sector) having the highest data rate.

In some embodiments of the present invention, the disk drive is further partitioned or formatted into a plurality of clusters, which are sorted by the respective data rates. For example, clusters that are located closer to the outer diameter of the platters may have higher data rates than clusters located farther from the outer diameter. The clusters can be configured to have a predetermined or fixed number of cylinders such that seek times within a particular cluster are constrained.

System Overview

FIG. 1 illustrates a disk drive 100 according to one embodiment of the invention. Disk drive 100 comprises a disk or platter 102, an actuator arm 4, a physical head 104 actuated radially over the disk 102 and connected to a distal end of the actuator arm 4. The disk 102 comprises a plurality of data tracks 10. In one embodiment, the disk 102 can comprise one or more reserved tracks. The disk drive further comprises a controller 14.

In one embodiment, the disk 102 comprises a plurality of servo sectors $24_0$-$24_N$ that define the plurality of data tracks 10. The controller 14 processes the read signal to demodulate the servo sectors $24_0$-$24_N$ into a position error signal (PES). The PES is filtered with a suitable compensation filter to generate a control signal 26 applied to a voice coil motor (VCM) 110 which rotates the actuator arm 4 about a pivot in order to position the physical head 104 radially over the disk 102 in a direction that reduces the PES. The servo sectors $24_0$-$24_N$ may comprise any suitable position information, and in one embodiment, as is shown in FIG. 1B, each servo sector comprises a preamble 30 for synchronizing gain control and timing recovery, a sync mark 32 for synchronizing to a data field 34 comprising coarse head positioning information such as a track number, and servo bursts 36 which provide fine head positioning information. The coarse head position information is processed to position a head over a target track during a seek operation, and the servo bursts 36 are processed to maintain the head over a centerline of the target track while writing or reading data during a tracking operation.

Because the disk 102 is rotated at a constant angular velocity, the data rate is increases toward the outer diameter tracks as the linear velocity is higher in relation to that of the inner diameter tracks (where radius is smaller). Tracks 10 can be grouped into a number of zones, wherein the data rate is substantially constant across a zone, and is increased from the inner diameter zones to the outer diameter zones. As is illustrated in FIG. 1, data tracks are grouped into three physical zones 120 (Zone 1), 118 (Zone 2), and 116 (Zone 3). Zone 1 120 is located closest to the inner diameter of the disk, and Zone 3 116 is located closest to the outer diameter of the disk. While three zones are illustrated in FIG. 1, those of ordinary skill in the art will appreciate that the disk 102 can comprise any suitable number of zones.

Figure 2A:
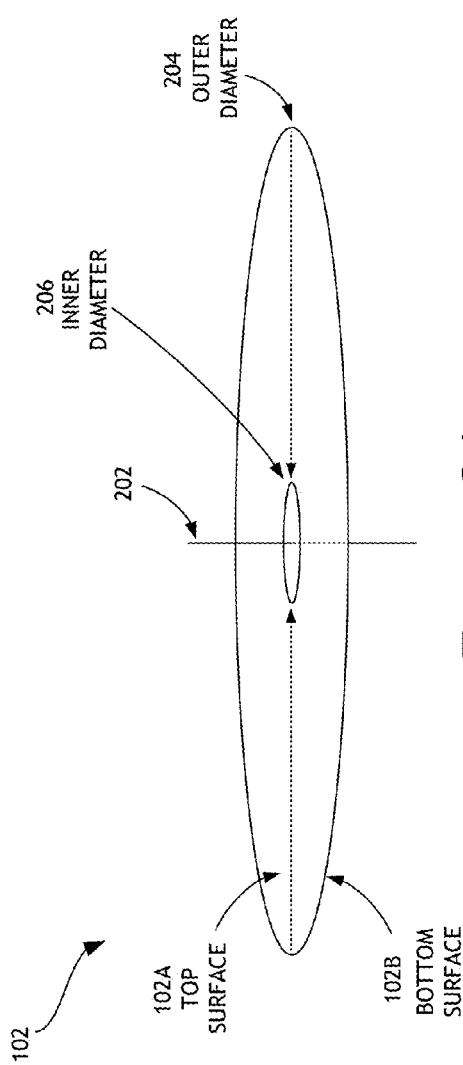
FIG. 2A illustrates a platter according to one embodiment of the invention.

FIG. 2A illustrates the disk or platter 102 according to one embodiment of the invention. The platter 102 comprises a top surface 102A and a bottom surface 102B, each of which comprise data tracks 10. The platter is rotated about a central axis 202. The inner diameter 206 of the platter is located closer to the central axis 202 than the outer diameter 204 of the platter.

Figure 2B:
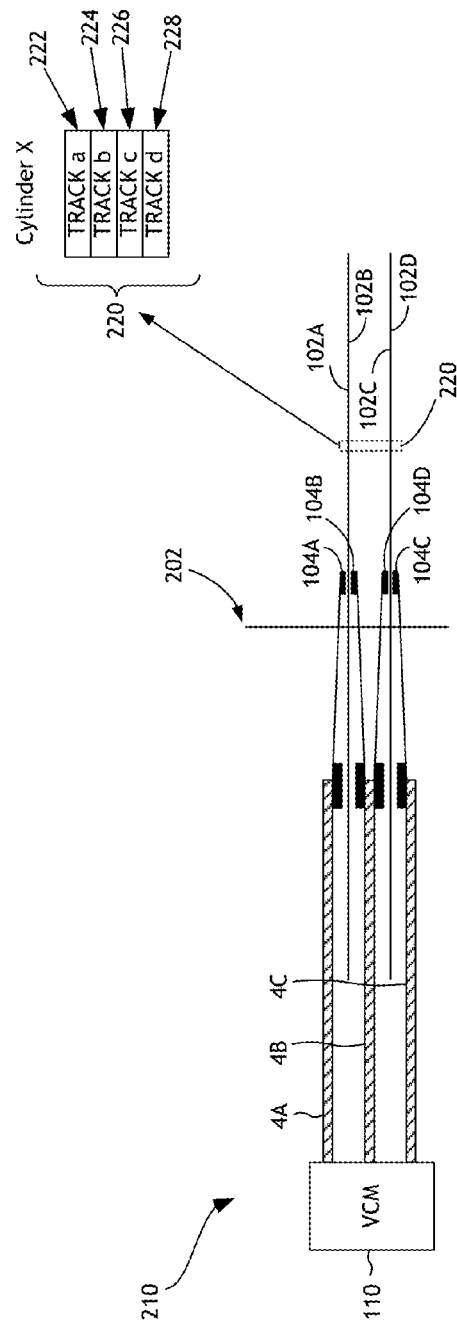
FIG. 2B illustrates a disk drive with multiple disk surfaces and heads according to one embodiment of the invention.

FIG. 2B illustrates a disk drive 210 with multiple disk surfaces (102A, 102B, 102C, and 102D) and physical heads (104A, 104B, 104C, and 104D) according to one embodiment of the invention. Each physical head $104_i$ is attached to a distal end of a respective actuator arm $4_i$ (4A, 4B, or 4C), and is rotated about a pivot by a voice coil motor (VCM) 110 in order to actuate the physical head $104_i$ radially over the disk surface $102_i$. Each head is configured to access data tracks 10 of the respective disk surface $102_i$. Disk surfaces are rotated about central axis 202.

In one embodiment, tracks across disk surfaces $102_i$ are grouped into a plurality of cylinders, wherein each track of the set of tracks in a particular cylinder is located substantially same distance from the central axis 202. For example, cylinder 220 comprises four tracks 222, 224, 226, and 228 located respectively on disk surfaces 102A, 102B, 102C, and 102D. Each of these tracks is accessed (e.g., written and read) and mapped by a respective physical head 104A, 104B, 104C, and 104D.

Figure 3:
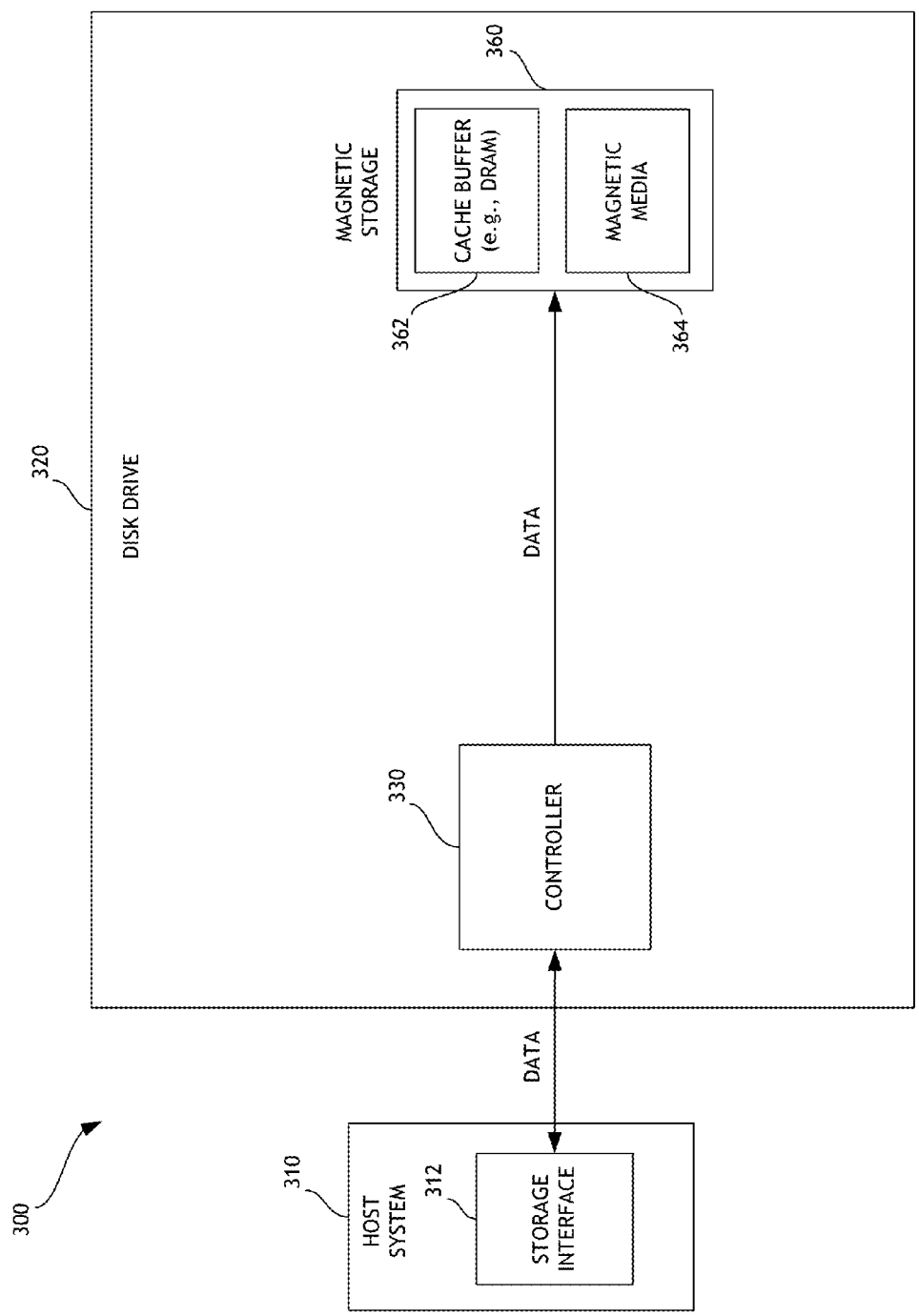
FIG. 3 illustrates a combination of a host system and a disk drive according to one embodiment of the invention

FIG. 3 illustrates a combination 300 of a host system and a disk drive according to one embodiment of the invention. As is shown, a disk drive 320 (e.g., a hard disk drive) includes a controller 330 (which can comprise the controller 14) and a magnetic storage module 360. The magnetic storage module 360 comprises magnetic media 364 (e.g., one or more disks 102) and a cache buffer 362 (e.g., DRAM). The cache buffer 362 can comprise volatile storage (e.g., DRAM, SRAM, etc.), non-volatile storage (e.g., non-volatile solid-state memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), or other discrete NVM (non-volatile memory) chips), or any combination thereof. In one embodiment, the cache buffer 362 can store system data.

The controller 330 can be configured to receive data and/or storage access commands from a storage interface module 312 (e.g., a device driver) of a host system 310. Storage access commands communicated by the storage interface 312 can include write data and read data commands issued by the host system 310. Read and write commands can specify a logical address (e.g., LBA) used to access the disk drive 320. The controller 330 can execute the received commands in the magnetic storage module 360.

Disk drive 320 can store data communicated by the host system 310. In other words, the disk drive 320 can act as memory storage for the host system 310. To facilitate this function, the controller 330 can implement a logical interface. The logical interface can present to the host system 310 disk drive's memory as a set of logical addresses (e.g., contiguous address) where host data can be stored. Internally, the controller 330 can map logical addresses to various physical locations or addresses in the magnetic media 364.

Examples of Mapping

FIG. 4A illustrates serpentine mapping 400A according to one embodiment of the invention. Serpentine mapping can be performed by the controller 330 and/or controller 14. Data tracks 410 of a plurality of disk surfaces are accessed and mapped by a plurality of physical heads 104A, 104B, 104C, and 104D. Data tracks are grouped into a plurality of clusters 404A, 406A, and 408A. The clusters are sorted according to the respective data rates. For example, the data rate of cluster 404A (which is located closest to the outer diameter) may be higher than the data rate of cluster 406A, which in turn may have higher data rate than that of cluster 408A (which is located closest to the inner diameter). The clusters can have a predetermined or fixed number of cylinders (e.g., 64 or less, 128 or less, 128 or more, etc.). While four physical heads and three clusters are illustrated in FIG. 4A, those of ordinary skill in the art will appreciate that any suitable number of heads and clusters can be utilized.

In one embodiment, the disk drive is mapped beginning with track 402A (located closest to the outer diameter) associated with the first physical head (e.g., physical head 104A). Mapping is continued with subsequent tracks of cluster 404A associated with the physical head 104A. When the last track within the cluster 404A is mapped, mapping is switched to the next physical head (e.g., physical head 104B) and tracks associated with that physical head are mapped in reverse direction. In other words, tracks associated with the physical head 104B are mapped beginning with the track in the same cylinder as the last mapped track associated with the physical head 104A and ending with the track associated with the physical head 104B located closest to the outer diameter.

Mapping is then switched to the next physical head (e.g., physical head 104C) and tracks associated with that physical head are mapped in forward direction. This process continues until all tracks of cluster 404A associated with the physical heads 104A-104D have been mapped. At that point, mapping proceeds with the track associated with the first physical head (e.g., physical head 104A) in the next cluster (e.g., cluster 406A). This process continues until tracks in all clusters have been mapped. As explained above, one problem with serpentine mapping is that the first logical of the disk drive (e.g., LBA 0 corresponding to 402A) may not be mapped to a physical location in the disk drive (e.g., {cylinder, head, sector} tuple) having the highest data rate.

FIG. 4B illustrates sorted data zones mapping 400B according to one embodiment of the invention. Sorted data zones mapping can be performed by the controller 330 and/or controller 14. Data tracks 410 can be formatted or grouped into a number of zones, where each data zone is associated with a particular data rate. In particular, the data rate can be substantially constant across a zone, and can increase from the inner diameter zones to the outer diameter zones. As is illustrated in FIG. 4B, data tracks are grouped to form two zones 412 (Zone 1) and 414 (Zone 2). Zone 412 is located closest to the outer diameter of the disk, and zone 414 is located closest to the outer diameter of the disk. Zones can be sorted according to the respective data rates. For example, because zone 412 is located closer to the outer diameter, it has a higher data rate than zone 414. While two zones are illustrated in FIG. 4B, those of ordinary skill in the art will appreciate that the disk drive can comprise any suitable number of zones.

In one embodiment, the disk drive is mapped beginning with track 402B (located closest to the outer diameter) of the physical head determined to have the highest data rate (e.g., physical head 104B) and continuing with subsequent tracks of zone 412 associated with the physical head 104B. When the last track of zone 412 associated with the physical head 104B is mapped, mapping switches to the physical head having the next highest data rate (e.g., physical head 104D).

Tracks associated with the physical head 104D are mapped beginning with track 402B' (located closest to the outer diameter) and continuing with subsequent tracks of zone 412 associated with the physical head 104D. When the last track of zone 412 associated with the physical head 104D is mapped, mapping is switched to the physical head having the next highest data rate (e.g., physical head 104A). Tracks associated with the physical head 104A are mapped beginning with track 402B'' (located closest to the outer diameter) and continuing with subsequent tracks of zone 412 associated with the physical head 104A. When the last track of zone 412 associated with the physical head 104A is mapped, mapping is switched to the physical head having the lowest data rate (e.g., physical head 104C). Tracks associated with the physical head 104C are mapped beginning with the track located closest to the outer diameter and continuing with subsequent tracks of zone 412 associated with the physical head 104C. When the last track associated with the physical head 104C is mapped, mapping proceeds with a track (located closest to the outer diameter) associated with the physical head having the highest data rate (e.g., physical head 104B) in the next zone 414. This process continues until tracks in all zones have been mapped.

Using the sorted data zones approach, the first logical address of the disk drive (e.g., LBA 0 corresponding to 402B) is mapped to a physical location in the disk drive having the highest data rate. However, as explained above, one problem with using this approach is that seek times may not be deterministic. Because in a particular zone the disk drive may remain on tracks associated with a high data rate head (e.g., 104B) for a greater number of tracks in relation to physical heads having lower data rates, the distance traversed during switching to a lower data rate head (e.g., the distance between the last track associated with the high data rate head and first track associated with the lower data rate head, such as the distance between the last track in zone 412 associated with the physical head 104B and track 402B') may not be constrained. Accordingly, seek times within a particular zone may be longer than those achieved using serpentine mapping.

Sorted Serpentine Mapping

FIG. 4C illustrates sorted serpentine mapping 400C according to one embodiment of the invention. Sorted serpentine mapping can be performed by the controller 330 and/or controller 14. Any suitable serpentine mapping pattern may be employed, including cylinder serpentine and surface serpentine mapping patterns. In addition, any suitable non-serpentine mapping pattern may be employed. In one embodiment, physical heads are assigned or mapped to logical heads sorted by the data rate of the associated physical heads. For example, the logical heads can be sorted according to the decreasing data rate of the associated physical heads. Data rates of physical heads can be determined using calibration. The mapping between physical and logical heads can be stored, for example, in the cache buffer 362, with a persistent copy stored in the magnetic media 364. Using sorted serpentine mapping, the first logical address of the disk drive is mapped to a physical location in the disk drive having the highest data rate. In addition, cylinders are grouped into clusters of predetermined or fixed size so that seek distances within a particular cluster are deterministic and constrained.

As is illustrated in FIG. 4C, physical head 104B determined to have the highest data rate is mapped to the first logical head (e.g., logical head 0). Physical head 104D determined to have the second highest data rate is mapped to the second logical head (e.g., logical head 1). Physical head 104A determined to have the next highest data rate is mapped to the third logical head (e.g., logical head 2). Physical head 104C determined to have the lowest data rate is mapped to the last logical head (e.g., logical head 3).

In one embodiment, the disk drive is mapped beginning with track 402C (located closest to the outer diameter) associated with the first logical head (e.g., logical head 0 mapped to the physical head 104B). Because the first logical head is mapped to the physical head having the highest data rate, the first logical address of the disk drive (e.g., LBA 0) is mapped to a physical location with the highest data rate. Cylinders are further grouped into clusters of predetermined or fixed size. Three such clusters 404A, 406A, and 408A are illustrated in FIG. 4C. While four physical heads and three clusters are illustrated in FIG. 4C, those of ordinary skill in the art will appreciate that any suitable number of heads and clusters can be utilized.

Mapping continues with tracks associated with the first logical head subsequent to track 402C. When the last track of the cluster 404A associated with the first logical head is mapped, mapping is switched to the next logical head (e.g., logical head 1 mapped to the physical head 104D), and tracks associated with that logical head are mapped in reverse direction. In other words, tracks associated with the logical head 1 are mapped beginning with the track in the same cylinder as the last mapped track associated with the logical head 0 and ending with the track associated with the logical head 1 located closest to the outer diameter. Mapping is then switched to the next logical head (e.g., logical head 2 mapped to the physical head 104A), and tracks associated with that logical head in cluster 404A are mapped in forward direction. This process continues until all tracks in cluster 404A associated with all logical heads have been mapped. At that point, mapping proceeds with the track associated with the first logical head (e.g., logical head 0 mapped to the physical head 104B) in the next cluster (e.g., cluster 406A). This process continues until all tracks in all clusters have been mapped.

By using sorted serpentine mapping 400C, the disk drive can achieve substantially monotonically decreasing data rates within a particular cluster. This is due to starting the traversal with tracks associated with the physical head mapped to the logical head associated with the highest data rate and continuing the traversal until tracks associated with the physical head mapped to the logical head associated with the lowest data rate are mapped. When mapping switches to a subsequent cluster having a lower data rate, there may be increase in the data rate because of the switch from the physical head having the lowest data rate (tracks associated with which were mapped last) to the physical head having the highest data rate (tracks associated with which are being currently mapped).

Figure 5:
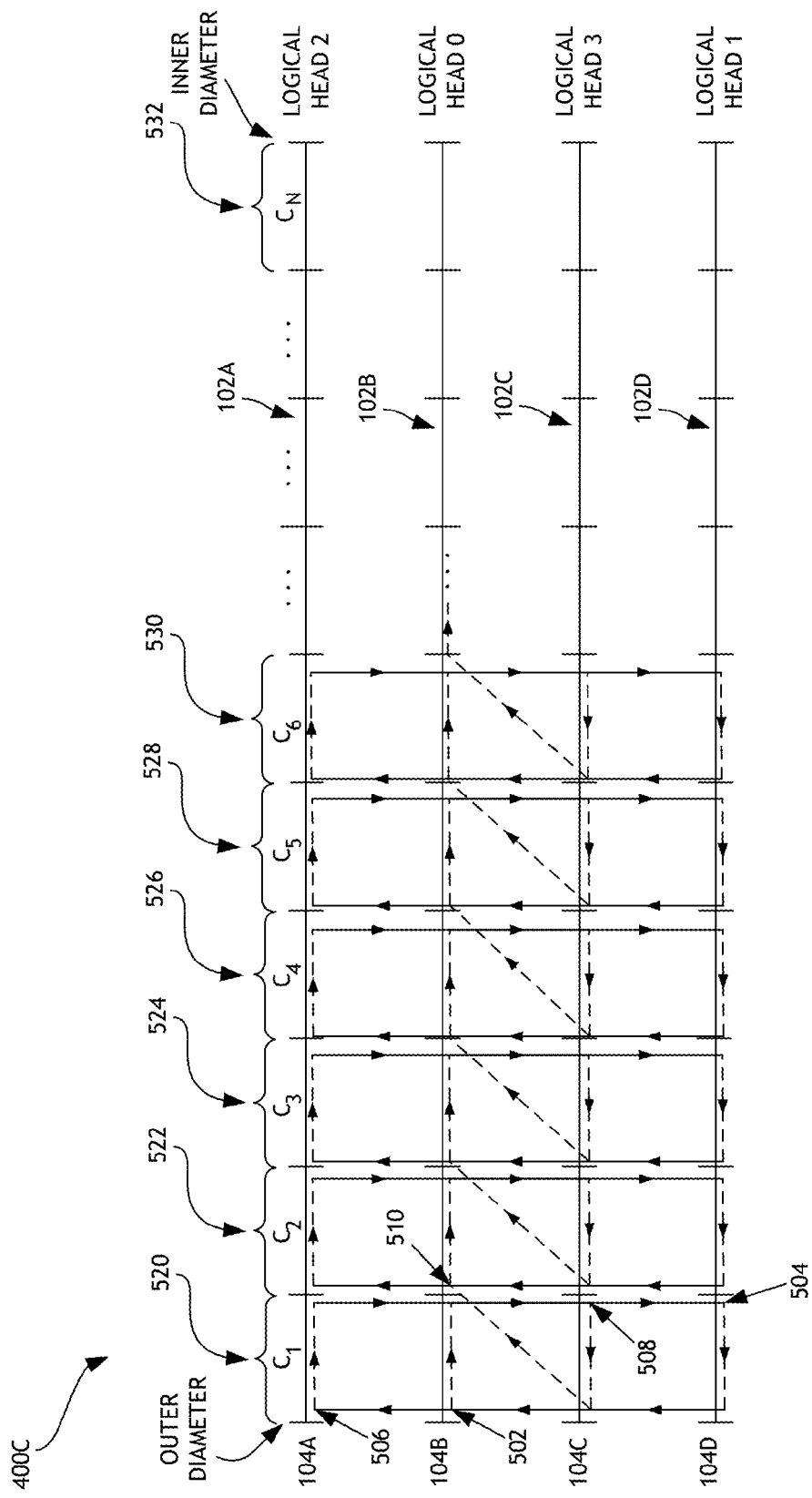
FIG. 5 further illustrates sorted serpentine mapping of FIG. 4C.

FIG. 5 further illustrates sorted serpentine mapping 400C of FIG. 4C. Cylinders are grouped into a plurality of clusters $C_1$ (520), $C_2$ (522), $C_3$ (524), $C_4$ (526), $C_5$ (528), $C_6$ (530) through $C_N$ (532) sorted according to the respective data rate of the associated cluster. For example, clusters located closer to the outer diameter of the platters (e.g., farthest from the central axis 202) associated with the surfaces 102A, 102B, 102C, and 102D have higher data rates than clusters located closer to the inner diameter of the platters. Four physical heads 104A, 104B, 104C, and 104D access and map tracks associated with the surfaces 102A, 102B, 102C, and 102D. While four physical heads are illustrated in FIG. 5, those of ordinary skill in the art will appreciate that any suitable number of heads can be utilized.

In one embodiment, physical heads are assigned or mapped to logical heads sorted by the data rate of the associated physical heads. As explained above, physical head 104B determined to have the highest data rate is mapped to the first logical head (e.g., logical head 0), physical head 104D determined to have the next highest data rate is mapped to the second logical head (e.g., logical head 1), physical head 104A determined to have the next highest data rate is mapped to the third logical head (e.g., logical head 2), and physical head 104C determined to have the lowest data rate is mapped to the last logical head (e.g., logical head 3). Disk surfaces 102A-102D are mapped beginning with track 502 (located closest to the outer diameter) associated with the first logical head (e.g., logical head 0 mapped to the physical head 104B). Mapping continues with tracks associated with the first logical head subsequent to track 506.

When the last track of the cluster 520 associated with the first logical head is mapped, mapping is switched to the next logical head (e.g., logical head 1 mapped to the physical head 104D), and tracks associated with that logical head are mapped in reverse direction starting with track 504. In other words, tracks associated with the logical head 1 are mapped beginning with the track in the same cylinder as the last mapped track associated with the logical head 0 and ending with the track associated with the logical head 1 located closest to the outer diameter. Mapping is then switched to the next logical head (e.g., logical head 2 mapped to the physical head 104A), and tracks associated with that logical head are mapped in forward direction starting with track 506 and continuing with subsequent tracks in cluster 520 associated with the logical head 2. When the last track associated with that logical head is mapped, mapping is switched to the last logical head (e.g., logical head 3 mapped to the physical head 104C), and tracks associated with the last logical head are mapped in reverse direction starting with track 508. When the track associated with the logical head 3 located closest to the outer diameter is mapped, mapping proceeds with track 510 associated with the first logical head in the next cluster 522. This process continues until all tracks in all clusters have been mapped.

Figure 6:
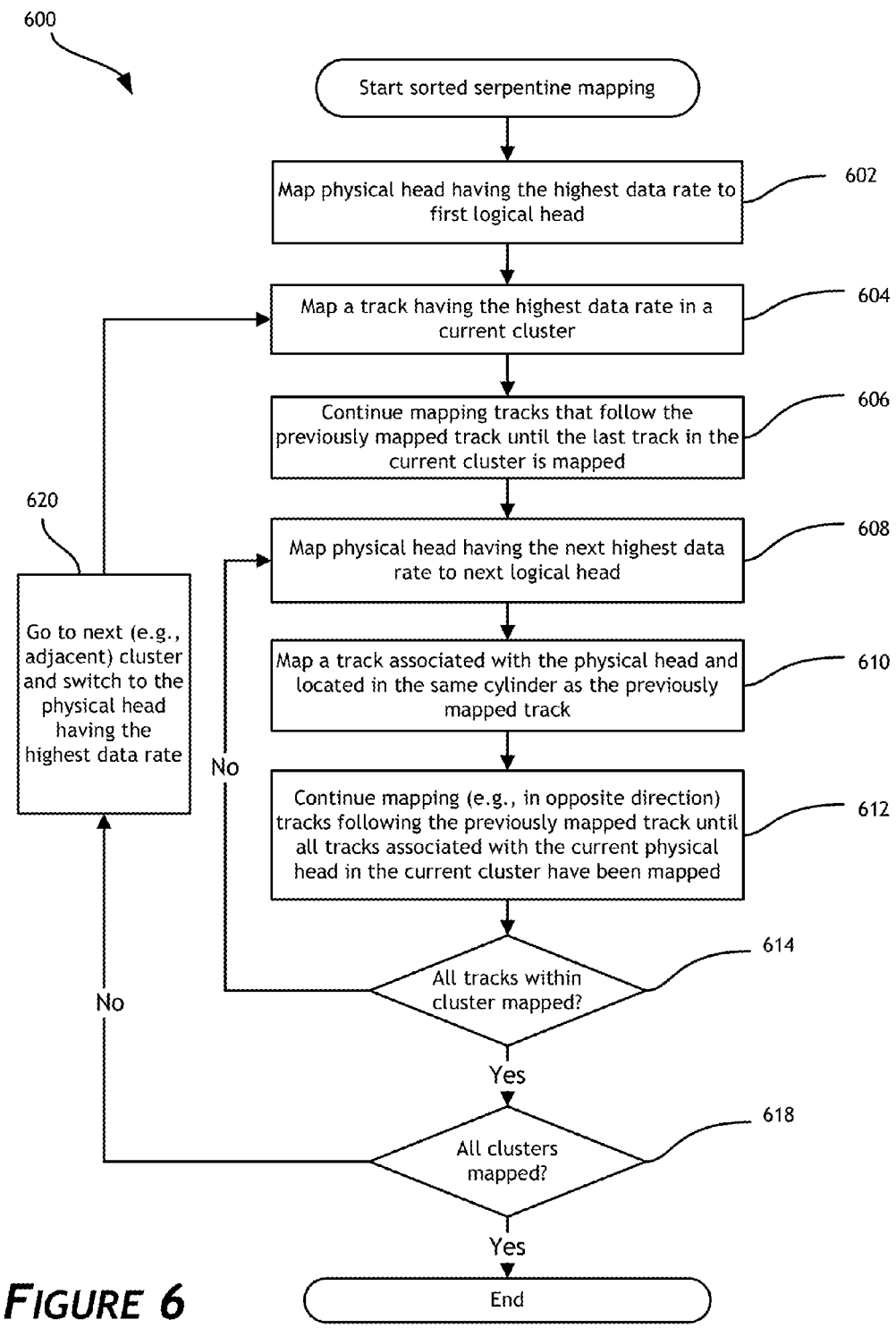
FIG. 6 illustrates a flow diagram of sorted serpentine mapping according to one embodiment of the invention.

FIG. 6 illustrates a flow diagram 600 of sorted serpentine mapping according to one embodiment of the invention. The process 600 can be performed by the controller 330 and/or controller 14. In one embodiment, the process 600 begins in block 602, where it maps the physical head determined to have the highest data rate to the first logical head (e.g., logical head 0). In block 604, the process maps a track in a current cluster (e.g., cluster having the highest data rate) and associated with the physical head mapped to the first logical head, and where the track has the highest data rate of all tracks of the disk drive. For example, this track can correspond to the track located closest to the outer diameter in the cluster having the highest data rate (e.g., track 402C and/or 502). This entire track or a segment in this track can be mapped as the first logical address of the disk drive (e.g., LBA 0).

In block 606, the process 600 continues mapping subsequent tracks until the last track in the current cluster (e.g., cluster where the track mapped in block 604 is located) associated with the physical head mapped to the first logical head is mapped. These tracks are part of a plurality of cylinders. In block 608, the process 600 maps the physical head having the next highest data rate to the next logical head (e.g., logical head 1). The process 600 also switches to that physical head. In block 610, the process 600 maps the track in the same cylinder as the last mapped track (e.g., associated with the previous physical head). In block 612, the process 600 continues to map tracks associated with the current physical head in opposite direction. In other words, if tracks associated with the previous physical head were mapped in forward direction (e.g., toward the inner diameter tracks), mapping is performed in reverse direction. Conversely, if tracks associated with the previous physical head were mapped in reverse direction (e.g., toward the outer diameter tracks), mapping is performed in forward direction. In another embodiment, the direction of mapping is not reversed (e.g., same direction is maintained). Mapping in block 612 is continued until all tracks in the current cluster associated with the current physical head have been mapped.

In block 614, the process 600 determines whether all tracks in the current cluster associated with all physical heads have been mapped. If not, the process 600 transitions to block 608, where the process maps the physical head having the next highest data rate to the next logical head. The process 600 switches to that physical head, and mapping continues as described above. If all tracks of the current cluster have been mapped, the process 600 transitions to block 618, where it determines whether all tracks in all clusters have been mapped. If not, the process 600 transitions to block 620, where it switches to the physical head having the highest data rate (e.g., mapped to the first logical head). The process 600 also switches to the cluster adjacent to the current cluster. In one embodiment, the process 600 switches to the cluster having the next highest data rate, such as a cluster that is immediately adjacent in the direction toward the inner diameter. The process 600 transitions to block 604, and mapping continues as is described above. In one embodiment, mapping terminates when all tracks in all clusters have been mapped. Mapping can be restarted from the track having the highest data rate of all tracks of the disk drive (e.g., track mapped to the first logical address in the disk drive). In another embodiment, mapping may not necessarily map all tracks in all clusters using the above-described approach. For example, a track or tracks in a particular cluster or clusters, or an entire cluster or a plurality of clusters can be mapped using any other suitable mapping scheme.

Figure 7:
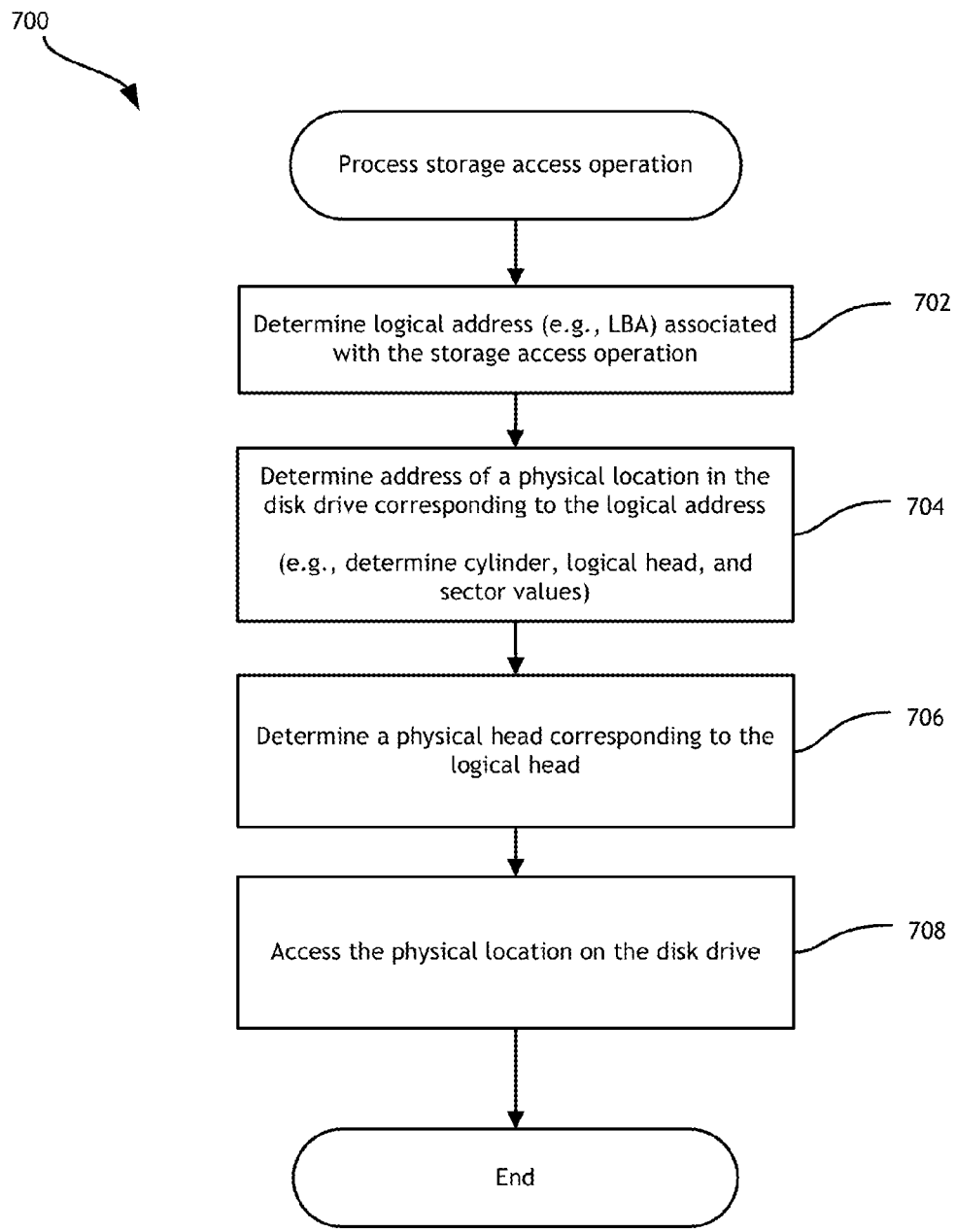
FIG. 7 illustrates a flow diagram for performing storage access operations according to one embodiment of the invention.

FIG. 7 illustrates a flow diagram 700 for performing storage access operations according to one embodiment of the invention. The process 700 can be performed by the controller 330 and/or controller 14. In one embodiment, the process 700 begins in block 702, where it determines the logical address (e.g., LBA) associated with a storage access operation, such as read data command and/or write data command. In block 704, the process determines the physical address or address of physical location in the disk drive that is associated with the specified logical address. In one embodiment, the physical address can be in a form of a {cylinder, logical head, sector} tuple. Those of ordinary skill in the art will appreciate that any suitable address format can be used.

In block 706, the process 700 determines the physical head associated with or mapped to the logical head corresponding to the logical address. In one embodiment, the process 700 can look up the physical head using the mapping stored in the cache buffer 362. Once the physical head has been determined, the process 700 transitions to block 708. The process 700 accesses the physical location in the disk drive that corresponds to the logical address specified by the storage access operation. Depending on the type of storage access operation, the process can retrieve data stored in the physical location (and in physical locations adjacent or subsequent to the physical location) and/or store host data in the physical location (and in physical locations adjacent or subsequent to the physical location).

CONCLUSION

Using sorted serpentine mapping, a plurality of physical heads of the disk drive is associated with or mapped to a plurality of logical heads. The plurality of logical heads is sorted according to the respective data rates of the physical heads, such as in the order of decreasing data rates. Data tracks are mapped using serpentine mapping that utilizes the sorted order of the logical heads. The first logical address of the disk drive (e.g., LBA 0) is mapped to a physical location (e.g., sector) in the disk drive having the highest data rate. In addition, when cylinders are grouped into a plurality of clusters of predetermined of fixed size and the plurality of clusters is sorted according to the data rate, seek times within a particular cluster are constrained. Furthermore, the disk drive can achieve substantially monotonically decreasing data rates within a particular cluster. Moreover, the average throughput of the disk drive is increased. Improved performance can thereby be attained.

Other Variations

Those skilled in the art will appreciate that in some embodiments, other types of mapping can be implemented. For example, in one embodiment, sorted serpentine mapping can be performed without reversing the direction of mapping after physical heads are switched. In addition, the actual steps taken in the disclosed processes, such as the process illustrated in FIGS. 6 and 7, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and method disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A storage drive system comprising:
    a plurality of disk platters aligned along a central axis, each disk platter comprising a plurality of disk surfaces, each disk surface comprising a plurality of tracks configured to store data;
    a plurality of physical heads associated with the plurality of disk surfaces, each physical head configured to access the plurality of tracks of the corresponding disk surface, wherein at least some physical heads in the plurality of physical heads have different data rates; and
    a controller configured to:
        associate a plurality of logical heads with the plurality of physical heads, each physical head associated with a different disk surface;
        sort the plurality of logical heads by respective data rates of the associated physical heads;
        designate as a first logical head the logical head associated with a physical head having a highest data rate in the plurality of physical heads; and
        map the plurality of tracks according to a serpentine mapping pattern, said serpentine mapping pattern based on the association of the plurality of physical heads with the plurality of logical heads so that a first logical address of a plurality of logical addresses used by a host system to access data stored in the storage drive system is mapped to an outermost track of a disk surface associated with the first logical head, wherein the controller is further configured to map as a first starting track of the serpentine mapping pattern the outermost track of the disk surface associated with the first logical head, and wherein mapping the plurality of tracks according to the serpentine mapping pattern results in improved performance as compared to grouping the plurality of tracks into a plurality of zones sorted in accordance with the respective data rates of the plurality of physical heads.

2. The system of claim 1, wherein the serpentine mapping pattern is further based on a plurality of clusters, each cluster comprising a plurality of cylinders, each cylinder comprising a set of tracks of the plurality of tracks, the number of tracks in the set of tracks being equal to the number of disk surfaces in the plurality of disk surfaces, and each track in the cylinder located substantially the same distance from the central axis as every other track in the cylinder.

3. The system of claim 2, wherein the controller is further configured to:
map a plurality of tracks of the plurality of cylinders of a cluster associated with the first starting track using the physical head associated with the first logical head;
designate as a second logical head the logical head associated with a physical head having a second highest data rate in the plurality of physical heads;
switch to the physical head corresponding to the second logical head; and
map a second starting track associated with the same cylinder as a previously mapped track of the plurality of tracks.

4. The system of claim 3, wherein the controller is further configured to map the plurality of tracks of the plurality of cylinders of the cluster associated with the first starting track by:
mapping a first adjacent track located in a cylinder adjacent to a cylinder associated with the first starting track; and
mapping a second adjacent track located in a cylinder adjacent to the cylinder associated with the first adjacent track.

5. The system of claim 3, wherein the controller is further configured to:
using the physical heads in the order of sorted logical heads, map a second plurality of tracks of the plurality of cylinders of the cluster associated with the first starting track until all tracks associated with the cluster have been mapped, wherein the last mapped track of the cluster is associated with a physical head having the lowest data rate in the plurality of physical heads;
switch to the physical head corresponding to the first logical head; and
map a third starting track associated with a cluster adjacent to the cluster associated with the first starting track.

6. The system of claim 5, wherein the cluster associated with the third starting track is closer to the central axis than the cluster associated with the first starting track.

7. The system of claim 1, wherein the controller is further configured to:
in response to receiving from a host system a storage access operation associated with a logical address, determine a logical head corresponding to the logical address and determine a physical head corresponding to the logical head using the association of the plurality of physical heads with the plurality of logical heads; and
access a physical location on a track of the plurality of tracks using the physical head.

8. The system of claim 1, wherein the plurality of logical heads are sorted by a decreasing data rate of the plurality of physical heads.

9. The system of claim 1, further comprising solid-state memory.

10. A method of operating a storage drive comprising a plurality of disk platters aligned along a central axis, a plurality of disk surfaces corresponding to the plurality of disk platters, a plurality of tracks corresponding to each disk surface, and a plurality of physical heads configured to access the plurality of tracks of a corresponding disk surface, wherein at least some physical heads in the plurality of physical heads have different data rates, the method comprising:
associating a plurality of logical heads with the plurality of physical heads, each physical head associated with a different disk surface;
sorting the plurality of logical heads by respective data rates of the associated physical heads;
designating as a first logical head the logical head associated with a physical head having a highest data rate in the plurality of physical heads;
mapping the plurality of tracks according to a mapping pattern that utilizes the association of the plurality of physical heads with the plurality of logical heads so that a first logical address of a plurality of logical addresses is mapped to an outermost track of a disk surface associated with the first logical head, the outermost track of the disk surface associated with the first logical head; and
mapping as a first starting track of the mapping pattern the outermost track of the disk surface associated with the first logical head,
wherein the method is performed by a controller of the storage drive, and
wherein the method achieves improved performance as compared to grouping the plurality of tracks into a plurality of zones sorted in accordance with the respective data rates of the plurality of physical heads.

11. The method of claim 10, further comprising:
defining a plurality of clusters, each cluster comprising a plurality of cylinders, each cylinder of the plurality of cylinders comprising a set of tracks of the plurality of tracks, the number of tracks in the set of tracks being equal to the number of disk surfaces in the plurality of disk surfaces, and each track in the cylinder being located substantially the same distance from the central axis as every other track in the cylinder; and
operating the plurality of physical heads to map the plurality of tracks according to a serpentine mapping pattern that utilizes the defined plurality of clusters.

12. The method of claim 11, wherein the serpentine mapping pattern utilizes the defined plurality of clusters by mapping tracks of the plurality of clusters in a descending order of distance from the central axis.

13. The method of claim 12, wherein mapping the plurality of clusters comprises:
mapping a plurality of tracks of the plurality of cylinders of a cluster associated with the first starting track using the physical head associated with the first logical head;
designating as a second logical head the logical head associated with a physical head having a second highest data rate in the plurality of physical heads;

switching to the physical head corresponding to the second logical head; and mapping a second starting track associated with the same cylinder as a previously mapped track of the plurality of tracks.

14. The method of claim 13, wherein mapping the plurality of tracks of the plurality of cylinders of the cluster associated with the first starting track comprises:

mapping a first adjacent track located in a cylinder adjacent to a cylinder associated with the first starting track; and mapping a second adjacent track located in a cylinder adjacent to the cylinder associated with the first adjacent track.

15. The method of claim 13, further comprising:

using the physical heads in the order of sorted logical heads, mapping a second plurality of tracks of the plurality of cylinders of the cluster associated with the first starting track until all tracks associated with the cluster have been mapped, wherein the last mapped track of the cluster is associated with a physical head having the lowest data rate in the plurality of physical heads;

switching to the physical head corresponding to the first logical head; and mapping a third starting track associated with a cluster adjacent to the cluster associated with the first starting track.

16. The method of claim 10, further comprising:

in response to receiving from a host system a storage access operation associated with a logical address, determining a logical head corresponding to the logical address and determining a physical head corresponding to the logical head using the association of the plurality of physical heads to the plurality of logical heads; and accessing a physical location on a track of the plurality of tracks using the physical head.

17. The method of claim 10, wherein the plurality of logical heads are sorted by a decreasing data rate of the plurality of physical heads.

18. A storage drive system comprising:

a plurality of disk platters aligned along a central axis, each disk platter comprising a plurality of disk surfaces, each disk surface comprising a plurality of tracks configured to store data;

a plurality of physical heads associated with the plurality of disk surfaces, each physical head configured to access the plurality of tracks of the corresponding disk surface, wherein at least some physical heads in the plurality of physical heads have different data rates; and a controller configured to:

associate a plurality of logical heads with the plurality of physical heads, each physical head associated with a different disk surface;

sort the plurality of logical heads by respective data rates of the associated physical heads;

designate as a first logical head the logical head associated with a physical head having a highest data rate in the plurality of physical heads; and map the plurality of tracks according to a serpentine mapping pattern, said serpentine mapping pattern based on: 1) the association of the plurality of physical heads with the plurality of logical heads so that a first logical address of a plurality of logical addresses used by a host system to access data stored in the storage drive system is mapped to an outermost track of a disk surface associated with the first logical head and 2) a plurality of fixed size clusters, wherein the controller is further configured to map as a first starting track of the serpentine mapping pattern the outermost track of the disk surface associated with the first logical head, wherein the serpentine mapping pattern associates logical addresses used by a host system with physical locations in the storage drive system, and wherein mapping the plurality of tracks according to the serpentine mapping pattern results in improved performance as compared to grouping the plurality of tracks into a plurality of zones sorted in accordance with the respective data rates of the plurality of physical heads.

19. The system of claim 18, wherein at least one cluster comprises a plurality of tracks, the plurality of tracks comprising the same number of tracks associated with each logical head of the plurality of logical heads.

20. The system of claim 19, wherein the controller is further configured to:

map the plurality of tracks of the at least one cluster associated with the first starting track using the physical head associated with the first logical head;

determine a second logical head associated with a physical head having the next highest data rate;

switch to the physical head associated with the second logical head;

map a second starting track located substantially the same distance from the central axis as the last mapped track associated with the first logical head.

21. The system of claim 20, wherein the controller is further configured to:

using the physical heads in the order of sorted logical heads, continue to map the plurality of tracks of the at least one cluster until all the tracks for the cluster have been mapped, wherein the last mapped track of the at least cluster is associated with a physical head having the lowest data rate in the plurality of physical heads;

switch to the physical head corresponding to the first logical head; and map a third starting track associated with a second cluster as the starting track of the second cluster, wherein the second cluster is adjacent to the at least one cluster.

22. The system of claim 21, wherein the second cluster associated with the third starting track is closer to the central axis than the at least one cluster associated with the first starting track.

23. The system of claim 18, further comprising solid-state memory.

* * * * *